United States Patent
Ikuta et al.

(10) Patent No.: US 9,583,987 B2
(45) Date of Patent: Feb. 28, 2017

(54) STATOR FOR ELECTRIC ROTATING MACHINE AND METHOD OF MANUFACTURING THE SAME

(75) Inventors: Hiroyuki Ikuta, Anjo (JP); Junichi Nakazono, Okazaki (JP); Kuniharu Teshima, Kariya (JP); Yuusuke Hara, Anjo (JP)

(73) Assignee: DENSO CORPORATION, Kariya (JP)

( * ) Notice: Subject to any disclaimer, the term of this patent is extended or adjusted under 35 U.S.C. 154(b) by 394 days.

(21) Appl. No.: 13/352,526

(22) Filed: Jan. 18, 2012

(65) Prior Publication Data
US 2012/0181893 A1  Jul. 19, 2012

(30) Foreign Application Priority Data

Jan. 18, 2011 (JP) .................................. 2011-008083
Dec. 13, 2011 (JP) .................................. 2011-272445

(51) Int. Cl.
*H02K 3/48* (2006.01)
*H02K 3/493* (2006.01)
(Continued)

(52) U.S. Cl.
CPC ............. *H02K 3/493* (2013.01); *H02K 1/148* (2013.01); *H02K 1/16* (2013.01); *H02K 15/024* (2013.01); *Y10T 29/49009* (2015.01)

(58) Field of Classification Search
CPC .......... H02K 1/16; H02K 1/148; H02K 3/493; H02K 15/024; H02K 15/026
(Continued)

(56) References Cited

U.S. PATENT DOCUMENTS 911,713 A * 2/1909 Frankenfield .................. 310/265
4,896,066 A * 1/1990 Tomite .......................... 310/214
(Continued)

FOREIGN PATENT DOCUMENTS

DE 102004045659 A1 * 4/2006
JP 54-156705 4/1978
(Continued)

OTHER PUBLICATIONS

DE 102004045659 A1 machine translation Mar. 12, 2014.*
(Continued)

*Primary Examiner* — Dang Le
*Assistant Examiner* — Leda Pham
(74) *Attorney, Agent, or Firm* — Nixon & Vanderhye P.C.

(57) ABSTRACT

A stator includes a hollow cylindrical stator core having stator teeth and slots. The stator teeth each extend radially inward and are circumferentially spaced from one another. Each of the slots is formed between one circumferentially-facing pair of the stator teeth and opens at the radially inner periphery of the stator core. Each of the stator teeth has a distal end portion that includes a slit, a base part and an oblique part. The slit is formed in a distal end surface of the stator tooth and extends axially. The base part and the oblique part are formed respectively on opposite circumferential sides of the slit. The base part extends radially inward to have a distal end surface that makes up an inner-diameter surface of the stator core. The oblique part is bent toward an adjacent slot so as to extend obliquely with respect to the base part.

5 Claims, 12 Drawing Sheets

(51) Int. Cl.
  *H02K 1/14*    (2006.01)
  *H02K 1/16*    (2006.01)
  *H02K 15/02*   (2006.01)

(58) Field of Classification Search
  USPC .... 310/216.064, 216.091, 216.093, 216.094,
                    310/216.098, 216.103, 216.104
  See application file for complete search history.

(56) References Cited

U.S. PATENT DOCUMENTS

| | | | |
|---|---|---|---|
| 5,986,377 A | | 11/1999 | Yamada et al. |
| 6,104,117 A | * | 8/2000 | Nakamura et al. ..... 310/216.074 |
| 7,528,516 B2 | * | 5/2009 | Mipo et al. ................... 310/187 |
| 8,466,596 B2 | * | 6/2013 | Maki ...................... H02K 1/148 |
| | | | 310/216.009 |
| 2009/0224619 A1 | * | 9/2009 | Okubo ..................... 310/156.25 |

FOREIGN PATENT DOCUMENTS

| | | | | |
|---|---|---|---|---|
| JP | S54-156705 | * | 4/1978 | |
| JP | 11-164526 | | 6/1999 | |
| JP | 11-308789 | | 11/1999 | |
| JP | 11308789 A | * | 11/1999 | ............... H02K 1/16 |
| JP | 2010-239721 | | 10/2010 | |
| JP | 2010-273460 | | 12/2010 | |

OTHER PUBLICATIONS

JP 11308789 A machine translation Oct. 15, 2014.*
JP S54-156705 spot translation.*
Office Action (2 pgs.) dated Oct. 17, 2013 issued in corresponding Japanese Application No. 2011-272445 with an at least partial English-language translation thereof (2 pgs.).

* cited by examiner

27
STATOR FOR ELECTRIC ROTATING MACHINE AND METHOD OF MANUFACTURING THE SAME

CROSS-REFERENCE TO RELATED APPLICATIONS

This application is based on and claims priority from Japanese Patent Applications No. 2011-8083 filed on Jan. 18, 2011 and No. 2011-272445 filed on Dec. 13, 2011, the contents of which are hereby incorporated by reference in their entireties into this application.

BACKGROUND

1 Technical Field

The present invention relates to stators for electric rotating machines that are used in, for example, motor vehicles as electric motors and electric generators, and to methods of manufacturing the stators.

2 Description of Related Art

Conventionally, there are known stators for electric rotating machines which include a hollow cylindrical stator core and a stator coil.

The stator core has a plurality of stator teeth and a plurality of slots. The stator teeth each extend radially inward and are spaced from one another in the circumferential direction of the stator core at predetermined intervals. Each of the slots is formed between a corresponding circumferentially-facing pair of the stator teeth so as to open at the radially inner periphery of the stator core. In addition, to reduce the iron loss, the stator core is formed by laminating a plurality of stator core sheets in the axial direction of the stator core; each of the stator core sheets is blanked out of a magnetic steel sheet so as to have a predetermined shape. The stator coil is comprised of a plurality of electric wires that are mounted on the stator core so as to be received in the slots of the stator core.

With the above configuration, however, the electric wires may be caused, for example by external vibration transmitted to the stator, to protrude radially inward from the slots of the stator core, thereby interfering with a rotor of the electric rotating machine which is disposed radially inside of the stator.

Japanese Patent Application Publication No. 2010-239721 discloses a technique for solving the above problem. According to the technique, as shown in FIG. 15A, each of the stator teeth 134 has a pair of radially-extending protrusions 136 formed at the distal end thereof. The radially-extending protrusions 136 each extend radially inward with a circumferential gap formed therebetween. After the electric wires that make up the stator coil are received in the slots 131 of the stator core 130, each of the radially-extending protrusions 136 is bent toward an adjacent one of the slots 131, thereby being transformed (or altered) into a circumferentially-extending protrusion 137 as shown in FIG. 15B. Consequently, for each of the slots 131 of the stator core 130, the opening of the slot 131 is partially closed by a corresponding pair of the circumferentially-extending protrusions 137; thus, the circumferential width of the opening becomes smaller than that of the electric wires received in the slot 131. As a result, the electric wires are prevented from protruding radially inward from the slots 131 of the stator core 130.

However, with the above technique, in forming the stator core sheets of the stator core 130 by blanking them out of a magnetic steel sheet, as shown in FIG. 16, those parts 136A of the magnetic steel sheet which will make up the radially-extending protrusions 136 of the stator teeth 134 protrude from a reference line L; the reference line L represents an inner-diameter surface of the stator core 130. Consequently, due to the protruding parts 136A, it is difficult to secure a high yield rate of the stator core 130, thereby making it difficult to minimize the manufacturing cost of the stator.

Moreover, with the above technique, for being transformed into the circumferentially-extending protrusions 137, the radially-extending protrusions 136 of the stator teeth 134 are bent almost at 90°, thereby inducing residual stress in the stator core 130. The residual stress will deteriorates the magnetic characteristics of the stator core 130, thereby lowering the efficiency of the electric rotating machine.

Furthermore, due to springback of the circumferentially-extending protrusions 137, there may be generated minor gaps 137A between the main bodies of the stator teeth 134 and the circumferentially-extending protrusions 137 (see FIG. 15B). Consequently, due to the minor gaps 137A, the torque of the electric rotating machine would be lowered and the iron loss of the stator core 130 would be increased.

SUMMARY

According to an exemplary embodiment, there is provided a stator for an electric rotating machine which includes a hollow cylindrical stator core and a stator coil. The stator core has a plurality of stator teeth and a plurality of slots. The stator teeth each extend radially inward and are spaced from one another in the circumferential direction of the stator core. Each of the slots is formed between a corresponding circumferentially-facing pair of side surfaces of the stator teeth so as to open at the radially inner periphery of the stator core. The stator coil is comprised of a plurality of electric wires that are mounted on the stator core so as to be received in the slots of the stator core. Further, in the stator, each of the stator teeth has a distal end portion and the distal end portion includes a slit, a base part and an oblique part. The slit is formed in a distal end surface of the stator tooth so as to extend in the axial direction of the stator core. The base part and the oblique part are formed respectively on opposite circumferential sides of the slit. The base part extends radially inward so as to have a distal end surface that makes up an inner-diameter surface of the stator core. The oblique part is bent toward an adjacent one of the slots of the stator core so as to extend obliquely with respect to the base part.

With the above configuration, the circumferential width of the openings of the slots at the radially inner periphery of the stator core is reduced, by the respectively adjacent oblique parts of the stator teeth, to become smaller than the circumferential width of the electric wires received in the slots. As a result, the electric wires received in the slots are prevented from protruding radially inward from the slots.

Moreover, with the above configuration, for each of the stator teeth, the distal end portion of the stator tooth includes the base part, and the distal end surface of the base part makes up an inner-diameter surface of the stator core. Therefore, in forming stator core sheets of the stator core by blanking them out of a magnetic steel sheet, there is no part of the magnetic steel sheet which is on the opposite side of the distal end surfaces of the base parts to the stator teeth and makes up a part of the stator core. Consequently, it is possible to secure a high yield rate of the stator core, thereby minimizing the manufacturing cost of the stator.

Furthermore, with the base parts of the stator teeth, the radial gap between those of the electric wires which are located radially innermost in the slots of the stator core and the inner-diameter surfaces of the stator core is increased, thereby lowering the eddy-current loss of the electric wires and thus increasing the efficiency of the electric rotating machine.

According to the exemplary embodiment, there is also provided a method of manufacturing a stator for an electric rotating machine. The method includes the steps of: (1) preparing a hollow cylindrical stator core and a stator coil, the stator core having a plurality of stator teeth and a plurality of slots, the stator teeth each extending radially inward and being spaced from one another in the circumferential direction of the stator core, each of the slots being formed between a corresponding circumferentially-facing pair of side surfaces of the stator teeth so as to open at the radially inner periphery of the stator core; (2) forming, for each of the stator teeth, a slit in a distal end surface of the stator tooth so as to extend in the axial direction of the stator core; (3) assembling the stator core and the stator coil together; and (4) bending, for each of the stator teeth, a part of a distal end portion of the stator tooth, which is on one circumferential side of the slit and adjacent to one of the slots of the stator core, toward the adjacent slot so as to extend obliquely with respect to a base part of the distal end portion, the base part being on the other circumferential side of the slit and extending radially inward so as to have a distal end surface that makes up an inner-diameter surface of the stator core.

With the above method, it is possible to easily manufacture the stator according to the exemplary embodiment.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
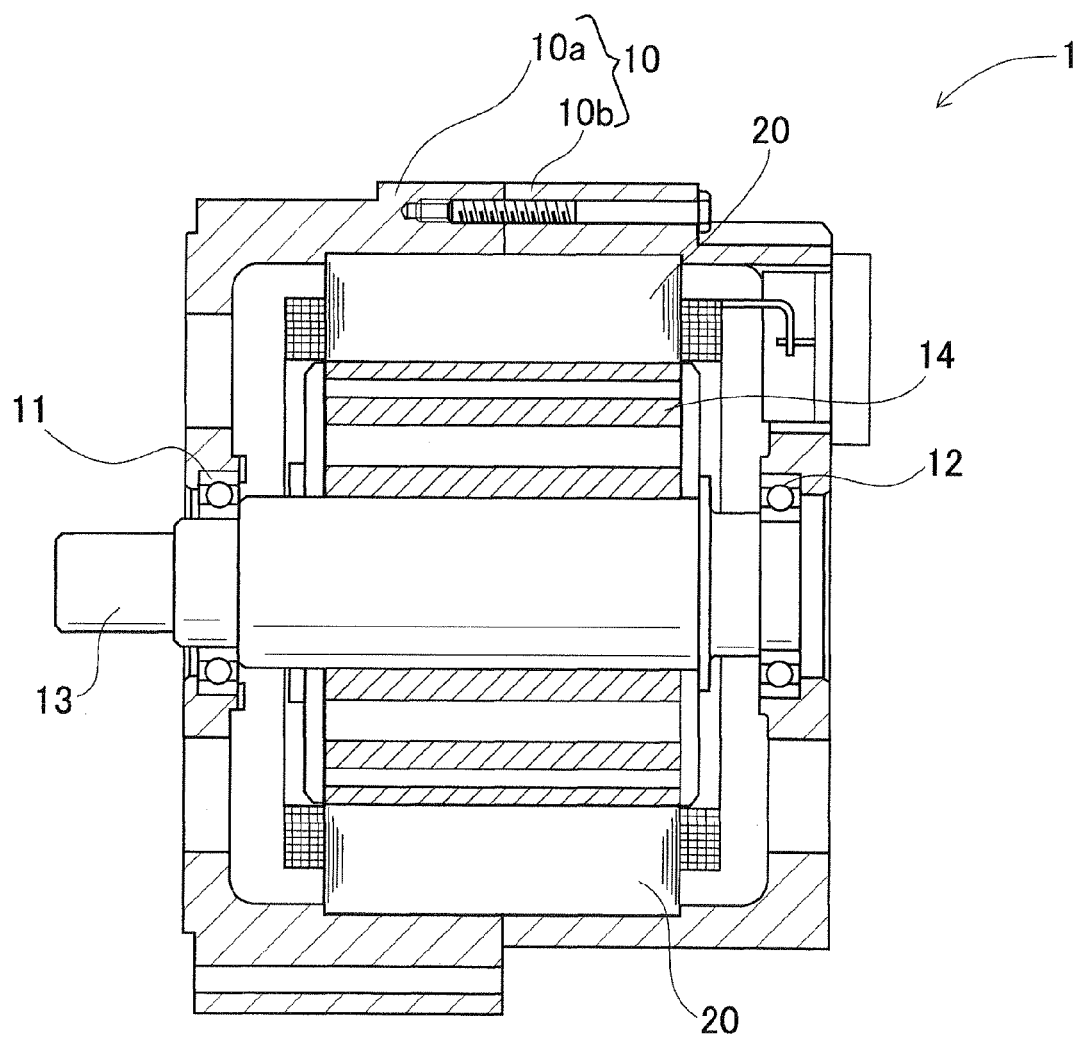
FIG. 1 is a schematic, partially cross-sectional view of an electric rotating machine which includes a stator according to a first embodiment.

Exemplary embodiments will be described hereinafter with reference to FIGS. 1-14. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 which includes a stator 20 according to a first embodiment.

The electric rotating machine 1 is designed to be used in a motor vehicle, such as an electric vehicle or a hybrid vehicle, and can function both as an electric motor and as an electric generator.

As shown in FIG. 1, the electric rotating machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 to face the radially inner periphery of the stator 20. The polarities of the magnetic poles alternate between north and south in the circumferential direction of the rotor 14. The number of the magnetic poles is set according to the design specification of the electric rotating machine 1. In the present embodiment, the number of the magnetic poles is set to be equal to, for example, eight (i.e., four north poles and four south poles).

Figure 2:
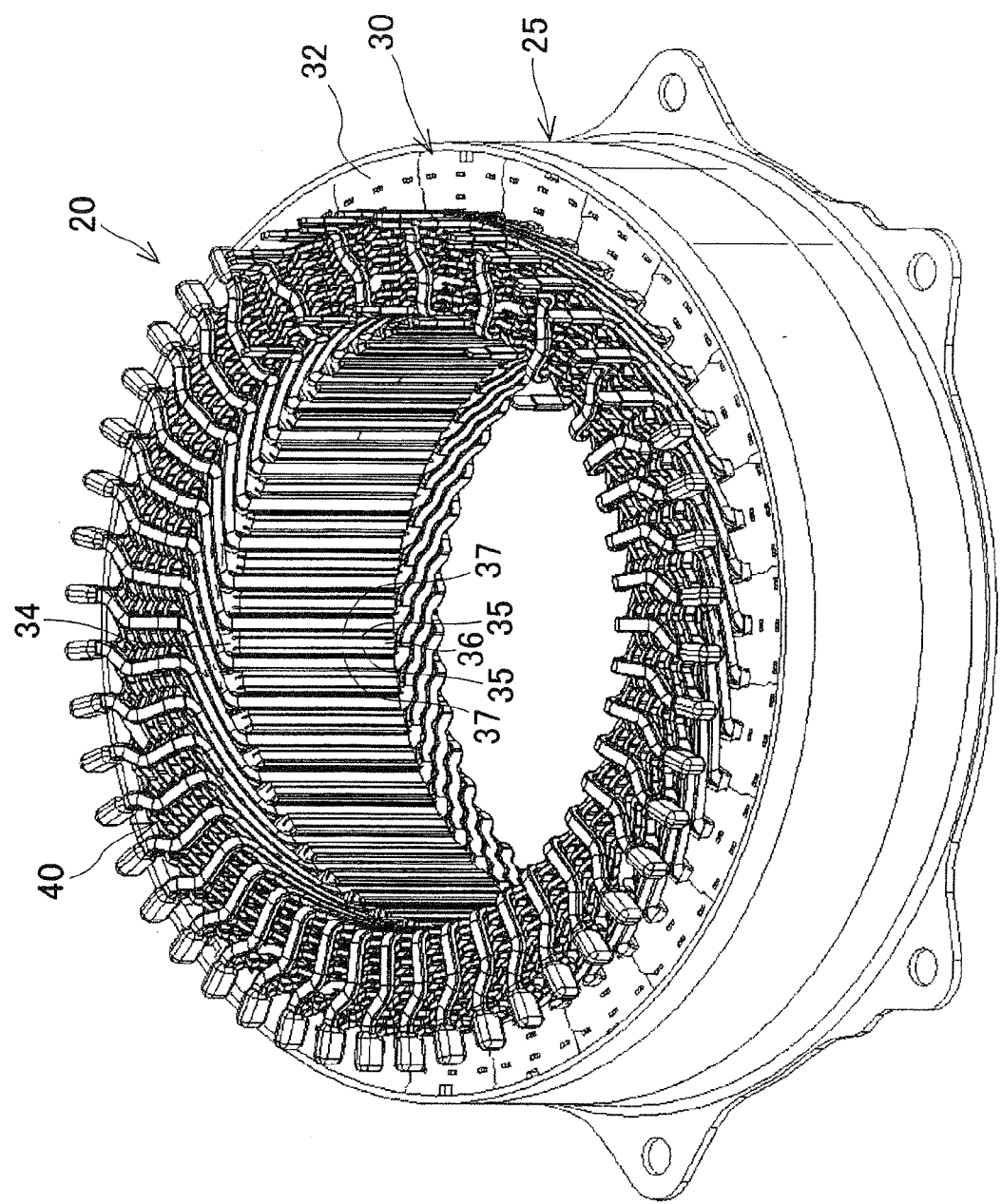
FIG. 2 is a perspective view of the stator.

Referring now to FIG. 2, the stator 20 includes a hollow cylindrical stator core 30, a three-phase stator coil 40 and an outer cylinder 25. In addition, the stator 20 may further have insulating paper interposed between the stator core 30 and the stator coil 40.

Figure 3:
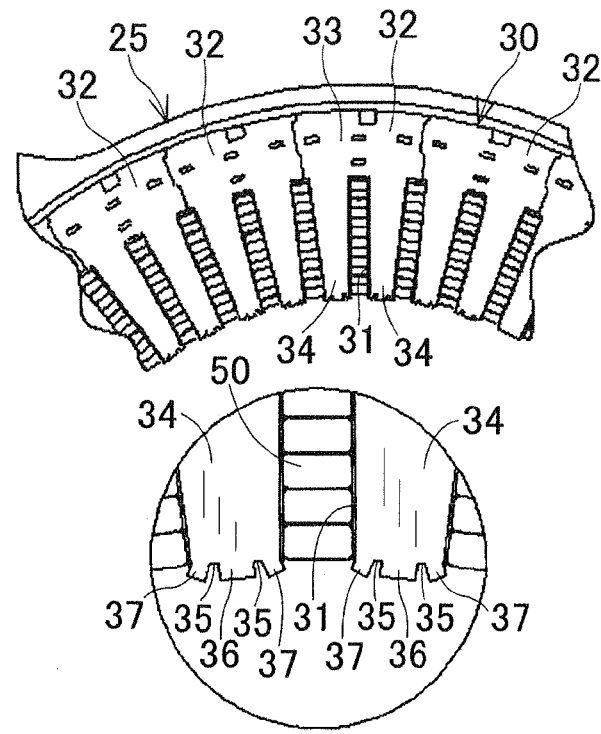
FIG. 3 is a schematic view illustrating distal end portions of stator teeth of the stator after forming oblique parts of the distal end portions.

The stator core 30 has, as shown in FIGS. 2 and 3, an annular back core portion 33 and a plurality of stator teeth 34 that each extend radially inward from the back core portion 33 and are spaced from one another in the circumferential direction of the stator core 30 (or the circumferential direction of the back core portion 33) at predetermined intervals. The back core portion 33 is located radially outside of the stator teeth 34 so as to both mechanically and magnetically connect the stator teeth 34.

The stator core 30 further has a plurality of slots 31 each of which is formed between a corresponding circumferentially-facing pair of side surfaces of the stator teeth 34 so as to extend radially inward from the back core portion 33 and open at the radially inner periphery of the stator core 30 In addition, in the present embodiment, the stator teeth 34 are so shaped that each circumferentially-facing pair of the side surfaces of the stator teeth 34 extend parallel to each other. Consequently, the circumferential width of each of the slots 31 is kept constant in the radial direction.

Moreover, in the present embodiment, there are provided two slots 31 per magnetic pole of the rotor 14 that has the eight magnetic poles and per phase of the three-phase stator coil 40. Accordingly, the total number of the slots 31 formed in the stator core 30 is equal to 48 (i.e., 2×8×3).

As to be described in detail later, the stator coil 40 is comprised of a plurality of electric wires 50 mounted on the stator core 30. Each of the electric wires 50 is substantially wave-shaped to include a plurality of in-slot portions and a plurality of turn portions. Each of the in-slot portions is received in a corresponding one of the slots 31 of the stator core 30. Each of the turn portions is located outside of the slots 31 of the stator core 30 and extends to connect a corresponding adjacent pair of the in-slot portions 51. In addition, in each of the slots 31 of the stator core 30, there are received a predetermined number (e.g., 12 in the present embodiment) of the in-slot portions of the electric wires 50 so as to be radially aligned with each other in the slot 31.

Furthermore, in the present embodiment, as shown in FIG. 3, each of the stator teeth 34 has a distal end portion; the distal end portion includes a pair of slits 35, a base part 36, and a pair of oblique parts 37. Each of the slits 35 is formed in the distal end surface of the stator tooth 34 so as to continuously extend in the axial direction of the stator core 30 over the entire axial length of the stator core 30 (see FIG. 2). The slits 35 are circumferentially positioned respectively on opposite sides of the circumferential centerline of the distal end surface of the stator tooth 34. Between the slits 35, there is formed the base part 36 that extends radially inward to have a distal end surface that makes up an inner-diameter surface of the stator core 30. The oblique parts 37 are formed respectively at the circumferential ends of the distal end portion of the stator tooth 34 and bent respectively toward the adjacent slots 31 so as to extend obliquely with respect to the base part 36. That is, for each of the slits 35, there is a corresponding one of the oblique parts 37 on one circumferential side of the slit 35 and the base part 36 on the other circumferential side of the slit 35.

Consequently, for each of the slots 31 of the stator core 30, the circumferential width of the opening of the slot 31 at the radially inner periphery of the stator core 30 is reduced, by the pair of the oblique parts 37 adjacent to the slot 31, to become smaller than the circumferential width of the in-slot portions of the electric wires 50 received in the slot 31. As a result, the electric wires 50 received in the slot 31 are prevented from protruding radially inward from the slot 31 and thus from interfering with the rotor 14 of the electric rotating machine 1 which is disposed radially inside of the stator 20.

In addition, it should be noted that "inner-diameter surface" of the stator core 30 denotes a surface which lies in an imaginary cylindrical plane defining the inner diameter of the hollow cylindrical stator core 30 and is thus positioned closest in the stator core 30 from the longitudinal axis of the stator core 30.

Figure 4:
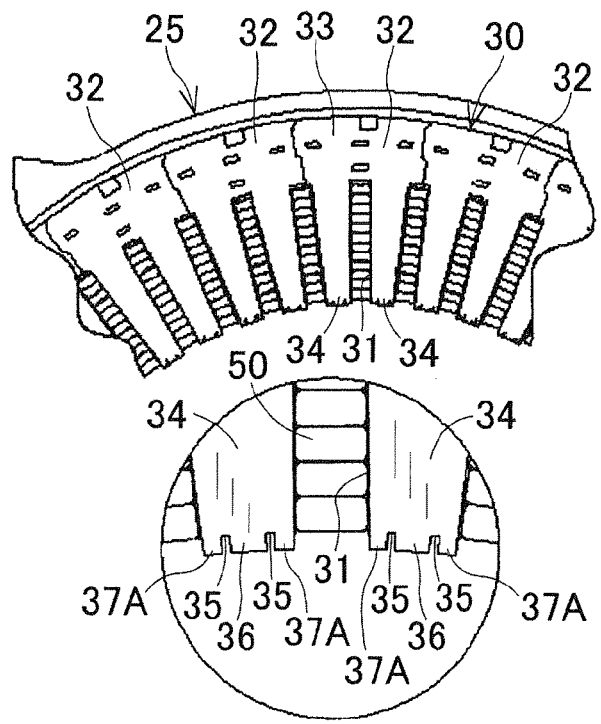
FIG. 4 is a schematic view illustrating the distal end portions of the stator teeth before forming the oblique parts of the distal end portions.

Referring further to FIG. 4, for each of the stator teeth 34, the distal end portion of the stator tooth 34 includes, before forming the oblique parts 37, a pair of radially-extending parts 37A that respectively make up the oblique parts 37. The radially-extending parts 37A are circumferentially separated from the base part 36 by the slits 35 respectively and each have a distal end surface that lies in the imaginary cylindrical plane that defines the inner diameter of the stator core 30. After the in-slot portions of the electric wires 50 are received in the slots 31 of the stator core 30, in other words, after the stator core 30 and the stator coil 40 are assembled together, the radially-extending parts 37A are bent using a jig, thereby being respectively transformed (or altered) into the oblique parts 37. In addition, in the present embodiment, each of the radially-extending parts 37A is bent at a predetermined acute angle with respect to the base part 36. That is, the amount of bending each of the radially-extending parts 37A is small. Therefore, the process of bending the radially-extending parts 37A to form the oblique parts 37 can be easily performed.

Turning back to FIGS. 2 and 3, the stator core 30 is comprised of a plurality (e.g., 24 in the present embodiment) of stator core segments 32. The stator core segments 32 are arranged in the circumferential direction of the stator core 30 so as to adjoin one another in the circumferential direction.

More specifically, each of the stator core segments 32 defines therein one slot 31. Moreover, each circumferentially-adjoining pair of the stator core segments 32 together defines a further one slot 31 therebetween. Each of the stator core segments 32 also has two stator teeth 34 formed therein; the two stator teeth 34 are connected with each other by a connecting portion of the stator core segment 32. In addition, all the connecting portions of the stator core segments 32 together make up the annular back core portion 33 of the stator core 30.

In the present embodiment, each of the stator core segments 32 is formed by laminating a plurality of stator core sheets in the axial direction of the stator core 30 and fixing them together by, for example, staking or welding. In addition, each of the stator steel sheets is blanked out of a magnetic steel sheet so as to have a predetermined shape as shown in FIG. 4.

The outer cylinder 25 is fitted on the radially outer surfaces of the stator core segments 32, thereby fastening the stator core segments 32 together to keep the hollow cylindrical shape of the stator core 30. In addition, all the radially outer surfaces of the stator core segments 32 together make up the radially outer surface of the stator core 32.

The stator coil 40 is formed of the wave-shaped electric wires 50 into a hollow cylindrical shape. More specifically, in the present embodiment, the stator coil 40 is formed by first stacking the electric wires 50 to form a flat band-shaped electric wire assembly and then rolling the flat band-shaped electric wire assembly by, for example, six turns into the hollow cylindrical shape. Further, as described previously, after the stator core 30 and the stator coil 40 are assembled together, each of the electric wires 50 includes the in-slot portions, each of which is received in the corresponding slot 31 of the stator core 30, and the turn portions each of which is located outside of the slots 31 of the stator core 30 and extends to connect the corresponding adjacent pair of the in-slot portions.

In addition, in the present embodiment, each of the electric wires 50 is configured with an electric conductor having a substantially rectangular cross section and an insulating coat that covers the outer surface of the electric conductor.

Next, a method of manufacturing the stator 20 according to the present embodiment will be described with reference to FIG. 5.

Figure 5:
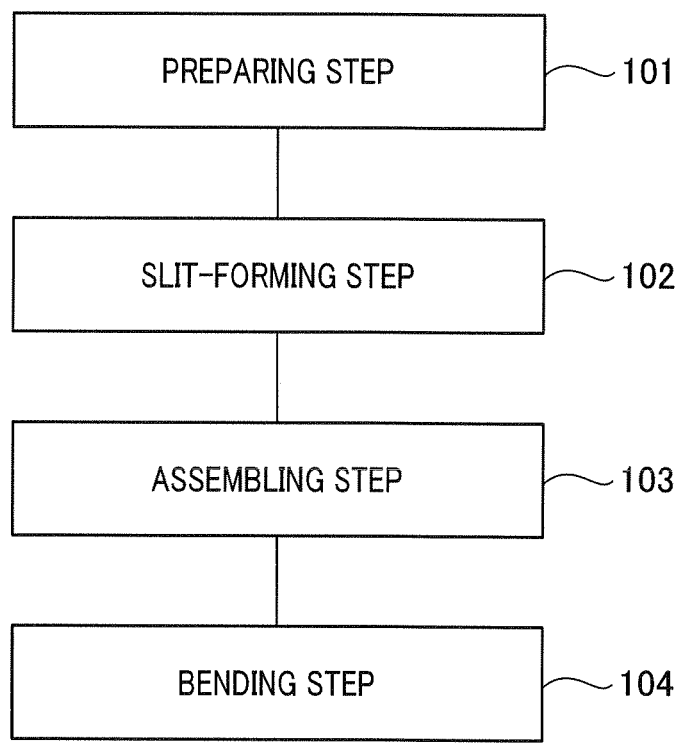
FIG. 5 is a flow chart illustrating a method of manufacturing the stator according to the first embodiment.

As shown in FIG. 5, the method according to the present embodiment includes a preparing step 101, a slit-forming step 102, an assembling step 103, and a bending step 104.

In the preparing step 101, the stator core segments 32 (i.e., the stator core 30), the cylindrical stator coil 40 and the outer cylinder 2 are prepared.

It should be noted that the stator core segments 32 prepared in this step are shaped as shown in FIG. 4, but have no slits 35 formed in the distal end surfaces of the stator teeth 34.

In the slit-forming step 102, for each of the stator teeth 34 of the stator core segments 32, the slits 35 as shown in FIG. 4 are formed in the distal end surface of the stator tooth 34 by, for example, machining.

Consequently, by this step, the base part 36 and the radially-extending parts 37A are also formed in the distal end portion of the stator tooth 34, as shown in FIG. 4.

In the assembling step 103, the stator core 30, the stator coil 40 and the outer cylinder 25 are assembled together.

Specifically, in this step, the stator teeth 34 of the stator core segments 32 are respectively inserted into the spaces formed between stacks of the in-slot portions of the electric wires 50 from the radially outside of the stator coil 40; each of the stacks includes twelve radially-aligned in-slot portions of the electric wires 50.

Consequently, as shown in FIG. 2, the in-slot portions of the electric wires 50 are respectively received in the corresponding slots 31 of the stator core 30. More specifically, for each of the electric wires 50, each adjacent pair of the in-slot portions are respectively received in a corresponding pair of the slots 31 which are separated from each other by a predetermined number (e.g., six in the present embodiment) of the slots 31. Moreover, each of the turn portions, which connects the corresponding adjacent pair of the in-slot portions, protrudes from a corresponding one of axial end faces of the stator core 30. In addition, all the turn portions of the electric wires 50 together make up a pair of coil ends of the stator coil 40 which respectively protrude from the axial end faces of the stator core 30.

Thereafter, the outer cylinder 25 is press-fitted onto the radially outer surfaces of the stator core segments 32, thereby fastening the stator core segments 32 together to keep the hollow cylindrical shape of the stator core 30.

In addition, it should be noted that the outer cylinder 25 may also be fitted onto the radially outer surfaces of the stator core segments 32 by other methods, for example shrink-fitting.

In the bending step 104, for each of the stator teeth 34, each of the radially-extending parts 37A of the stator tooth 34 as shown in FIG. 4 is bent toward the adjacent slot 31 at the predetermined acute angle with respect to the base part 36, thereby being transformed into one of the oblique parts 37 of the stator tooth 34 as shown in FIG. 3.

In other words, in this step, for each of the slits 35, the radially-extending part 37A that is circumferentially positioned on the opposite side of the slit 35 to the base part 36 is bent toward that one of the slots 31 which is immediately adjacent to the radially-extending part 37A.

In addition, for each of the stator teeth 34, the radially-extending parts 37A of the stator tooth 34 are respectively bent toward opposite sides in the circumferential direction of the stator core 30.

Figure 6:
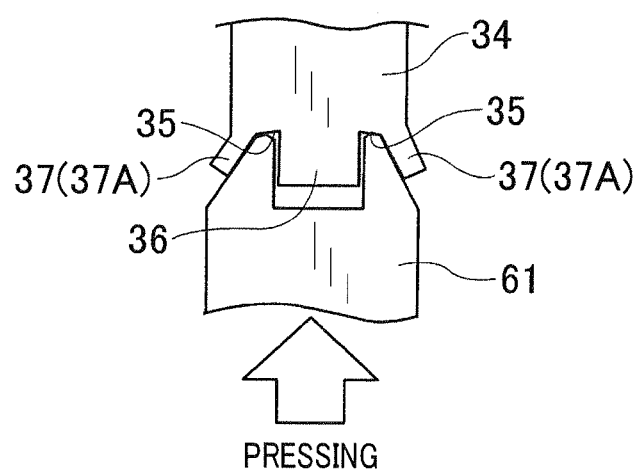
FIG. 6 is a schematic view illustrating a manner of performing a bending step of the method.
Figure 7:
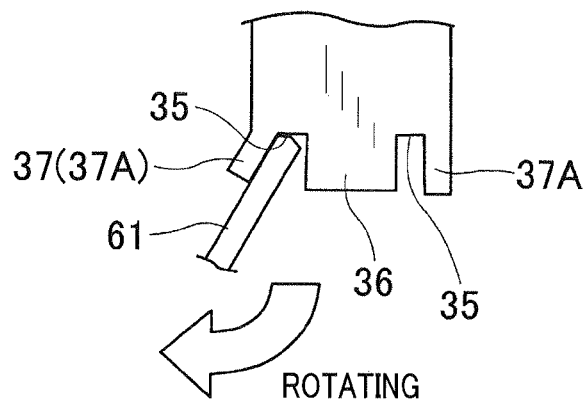
FIG. 7 is a schematic view illustrating another manner of performing the bending step of the method.

It should be noted that the bending step 104 can be performed in various manners. For example, as shown in FIG. 6, it is possible to press a pair of protrusions of a jig 61 respectively into the slits 35 of the stator tooth 34, thereby bending the radially-extending parts 37A of the stator tooth 34 respectively into the oblique parts 37. Otherwise, as shown in FIG. 7, it is also possible to insert a jig 62 into one of the slits 35 of the stator tooth 34 and rotating the adjacent radially-extending part 37A in a direction away from the base part 36, thereby bending the radially-extending part 37A into one of the oblique parts 37 of the stator tooth 34.

As a result of performing the above steps 101-104, the stator 20 as shown in FIG. 2 is obtained.

According to the present embodiment, it is possible to achieve the following advantages.

In the present embodiment, the stator 20 of the electric rotating machine 1 includes the hollow cylindrical stator core 30 and the stator coil 40 that is comprised of the electric wires 50 mounted on the stator core 30. The stator core 30 has the stator teeth 34 and the slots 31. The stator teeth 34 each extend radially inward and are spaced from one another in the circumferential direction of the stator core 30. Each of the slots 31 is formed between a corresponding circumferentially-facing pair of the side surfaces of the stator teeth 34 so as to open at the radially inner periphery of the stator core 30. The stator coil 40 is comprised of the electric wires 50 that are mounted on the stator core 30 so as to be received in the slots 31 of the stator core 30. Moreover, in the stator 20, for each of the stator teeth 34, the distal end portion of the stator tooth 34 includes the pair of slits 35, the base part 36 and the pair of oblique parts 37. Each of the slits 35 is formed in the distal end surface of the stator tooth 34 so as to extend in the axial direction of the stator core 30. The base part 36 extends radially inward so that the distal end surface of the base part 36 makes up an inner-diameter surface of the stator core 30. For each of the slits 35, there are the base part 36 and a corresponding one of the oblique parts 37 respectively on opposite circumferential sides of the slit 35. Each of the oblique parts 37 is bent toward an adjacent one of the slots 31 of the stator core 30 so as to extend obliquely with respect to the base part 36.

With the above configuration, for each of the slots 31 of the stator core 30, the circumferential width of the opening of the slot 31 at the radially inner periphery of the stator core 30 is reduced, by the pair of the oblique parts 37 of the stator teeth 34 adjacent to the slot 31, to become smaller than the circumferential width of the in-slot portions of the electric wires 50 received in the slot 31. As a result, the in-slot portions of the electric wires 50 received in the slot 31 are prevented from protruding radially inward from the slot 31 and thus from interfering with the rotor 14 of the electric rotating machine 1 which is disposed radially inside of the stator 20.

Moreover, for each of the stator teeth 34, the distal end portion of the stator tooth 34 includes the base part 36. The distal end surface of the base part 36 makes up an inner-diameter surface of the stator core 30.

With the above configuration, in forming the stator core sheets of the stator core 30 by blanking them out of a magnetic steel sheet, there is no part of the magnetic steel sheet which is on the opposite side of the distal end surfaces of the base parts 36 to the stator teeth 34 and makes up a part of the stator core 30. Consequently, it is possible to secure a high yield rate of the stator core 30, thereby minimizing the manufacturing cost of the stator 20.

Furthermore, with the base parts 36 of the stator teeth 34, the radial gap between those of the in-slot portions of the electric wires 50 which are located radially innermost in the slots 31 of the stator core 30 and the inner-diameter surfaces of the stator core 30 is increased, thereby lowering the eddy-current loss of the electric wires 50 and thus increasing the efficiency of the electric rotating machine 1.

In the present embodiment, for each of the stator teeth 34, the distal end portion of the stator tooth 34 includes the two slits 35 (or first and second slits 35), the single base part 36, and the two oblique parts 37 (or first and second oblique parts 37). The base part 36 is interposed between the two slits 35 in the circumferential direction of the stator core 30. Each of the oblique parts 37 is positioned on the circumferentially opposite side of a corresponding one of the slits 35 to the base part 36. The oblique parts 37 are bent respectively toward those two of the slots 31 of the stator core 30 which are adjacent to the stator tooth 34 and respectively on opposite circumferential sides of the stator tooth 34.

With the above configuration, for each of the slots 31 of the stator core 30, the opening of the slot 31 at the radially inner periphery of the stator core 30 is narrowed by a corresponding pair of the oblique parts 37 of the stator teeth 34. As a result, with the two corresponding oblique parts 37 narrowing the opening of the slot 31, it is possible to more reliably prevent the in-slot portions of the electric wires 50 received in the slot 31 from protruding radially inward from the slot 31 and thus from interfering with the rotor 14 of the electric rotating machine 1.

In the present embodiment, for each of the stator teeth 34, each of the oblique parts 37 of the stator tooth 34 extends obliquely at the predetermined acute angle with respect to the base part 36.

With the above configuration, in manufacturing the stator 20, each of the oblique parts 37 is accordingly formed by bending a corresponding one of the radially-extending parts 37A (see FIG. 4) at the predetermined acute angle. Consequently, the amount of bending the corresponding radially-extending part 37A is made small, thereby facilitating the bending step 104.

In the present embodiment, for each of the stator teeth 34, each of the slits 35 of the stator tooth 34 is formed in the distal end surface of the stator tooth 34 so as to continuously extend in the axial direction of the stator core 30 over the entire axial length of the stator core 30 (or from one axial end face to the other axial end face of the stator core 30).

With the above formation of the slits 35, each of the oblique parts 37 of the stator teeth 34 is also formed to continuously extend in the axial direction of the stator core 30 over the entire axial length of the stator core 30. As a result, with such oblique parts 37, it is possible to further reliably prevent the in-slot portions of the electric wires 50 received in the slot 31 from protruding radially inward from the slot 31 and thus from interfering with the rotor 14 of the electric rotating machine 1.

In the present embodiment, for each of the stator teeth 34, each of the oblique parts 37 of the stator tooth 34 extends from the main body of the stator tooth 34 without any gap formed between the oblique part 37 and the main body and without tapering toward the distal end surface of the oblique part 37.

With the above configuration, neither reduction in magnetic path width nor magnetic saturation occurs in the oblique parts 37 of the stator teeth 34. As a result, it is possible to prevent the torque of the electric rotating machine 1 from being decreased and the iron loss of the stator 20 from being increased.

In the present embodiment, the method of manufacturing the stator 20 includes the preparing step 101, the slit-forming step 102, the assembling step 103 and the bending step 104. In the preparing step 101, the stator core 30 (i.e., the stator core segments 32), the stator coil 40 and the outer cylinder 25 are prepared. In the slit-forming step 102, for each of the stator teeth 34, the slits 35 are formed in the distal end surface of the stator tooth 34. In the assembling step 103, the stator core 30, the stator coil 40 and the outer cylinder 25 are assembled together. In the bending step 104, for each of the stator teeth 34, the oblique parts 37 of the stator tooth 34 are formed by bending the radially-extending parts 37A respectively toward the adjacent slots 31 of the stator core 30.

With the above method, it is possible to easily manufacture the stator 20 according to the present embodiment.

Second Embodiment

This embodiment illustrates a stator 20 which has almost the same configuration as the stator 20 according to the first embodiment; accordingly, only the difference therebetween will be described hereinafter.

Figure 8:
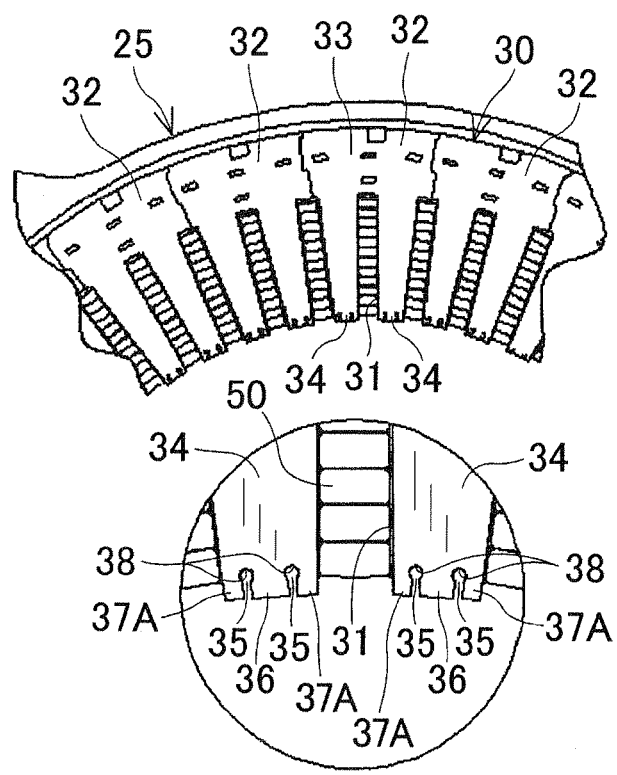
FIG. 8 is a schematic view illustrating distal end portions of stator teeth of a stator according to a second embodiment before forming oblique parts of the distal end portions.

In the present embodiment, as shown in FIG. 8, for each of the stator teeth 34, the distal end portion of the stator tooth 34 further includes a pair of stress relaxation parts 38 each of which is formed radially outside of a corresponding one of the slits 35 so as to adjoin the corresponding slit 35.

More specifically, each of the stress relaxation parts 38 is formed by axially cutting and thereby deepening the bottom of the corresponding slot 35. Further, each of the stress relaxation portions 38 is so formed as to have a larger circumferential width than the corresponding slot 35.

Figure 9:
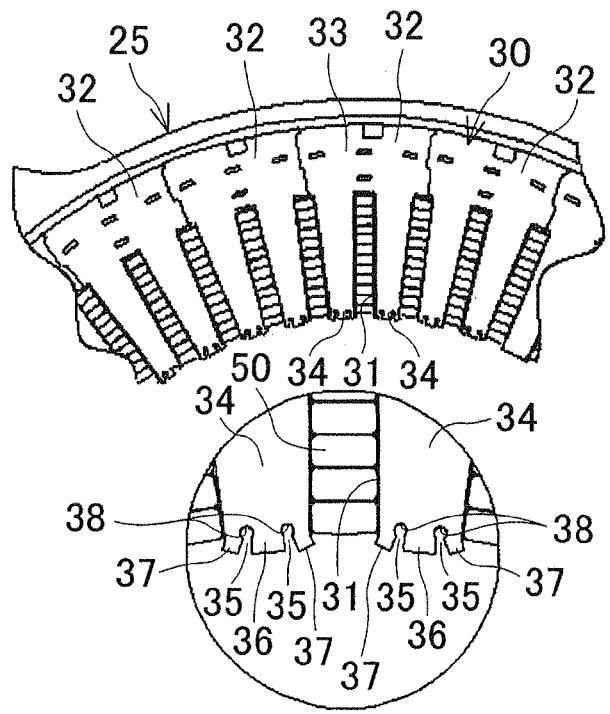
FIG. 9 is a schematic view illustrating the distal end portions of the stator teeth of the stator according to the second embodiment after forming the oblique parts of the distal end portions.

Consequently, as shown in FIG. 9, in forming each of the oblique parts 37 of the stator tooth 34, it is possible to more easily bend a corresponding one of the radially-extending parts 37A of the stator tooth 34 with the bending start point located at a corresponding one of the stress relaxation parts 38.

Moreover, since no stress resides in the stress relaxation parts 38, it is possible to prevent the efficiency of the electric rotating machine 1 from being decreased by residual stress which otherwise may be induced in the stator teeth 34 during the formation of the oblique parts 37 by bending.

In addition, the stator 20 according to the present embodiment also has the same advantages as the stator 20 according to the first embodiment.

Third Embodiment

This embodiment illustrates a stator 20 which has almost the same configuration as the stator 20 according to the first embodiment; accordingly, only the difference therebetween will be described hereinafter.

Figure 10:
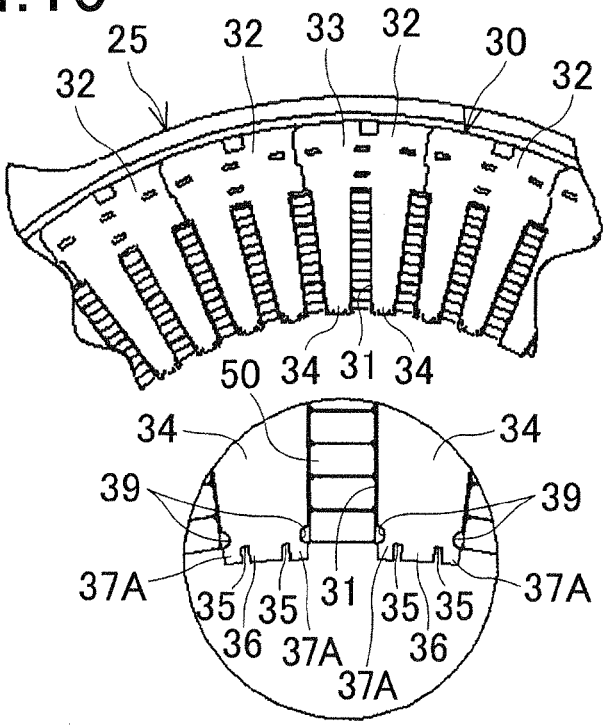
FIG. 10 is a schematic view illustrating distal end portions of stator teeth of a stator according to a third embodiment before forming oblique parts of the distal end portions.
Figure 11:
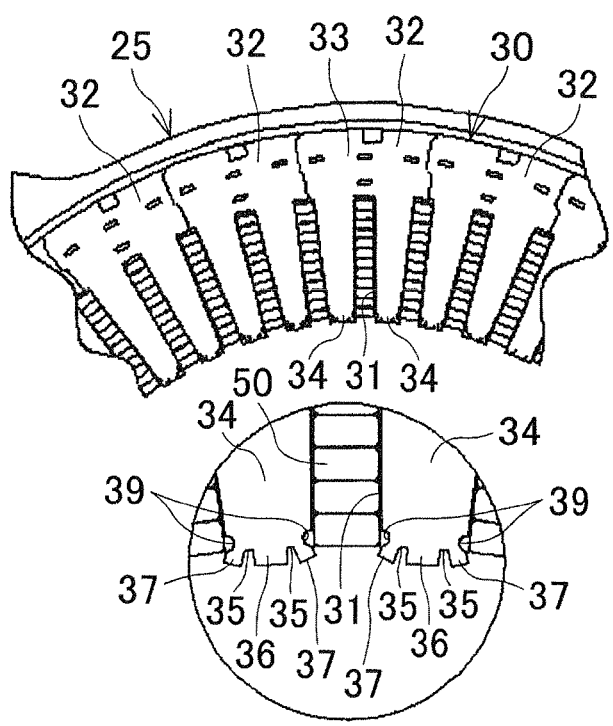
FIG. 11 is a schematic view illustrating the distal end portions of the stator teeth of the stator according to the third embodiment after forming the oblique parts of the distal end portions.

In the present embodiment, referring to FIGS. 10 and 11, for each of the stator teeth 34, the distal end portion of the stator tooth 34 further includes a pair of stress relaxation parts 39 each of which is formed radially outside of a corresponding one of the oblique parts 37 so as to adjoin the corresponding oblique part 37.

More specifically, each of the stress relaxation parts 39 is provided in the form of a groove that is formed in the corresponding circumferential side surface of the stator tooth 34 so as to extend in the axial direction of the stator core 30. Further, the stress relaxation parts 39 are provided at substantially the same radial position as the bottoms of the slits 35.

Consequently, as shown in FIG. 11, in forming each of the oblique parts 37 of the stator tooth 34, it is possible to more easily bend a corresponding one of the radially-extending parts 37A of the stator tooth 34 with the bending start point located at a corresponding one of the stress relaxation parts 39.

Moreover, since no stress resides in the stress relaxation parts 39, it is possible to prevent the efficiency of the electric rotating machine 1 from being decreased by residual stress which otherwise may be induced in the stator teeth 34 during the formation of the oblique parts 37 by bending.

In addition, the stator 20 also has the same advantages as the stator 20 according to the first embodiment.

Fourth Embodiment

This embodiment illustrates a stator 20 which has almost the same configuration as the stator 20 according to the first embodiment; accordingly, only the difference therebetween will be described hereinafter.

In the first embodiment, as shown in FIG. 2, for each of the stator teeth 34, each of the slits 35 of the stator tooth 34 is formed in the distal end surface of the stator tooth 34 so as to continuously extend in the axial direction of the stator core 30 over the entire axial length of the stator core 30.

Figure 12:
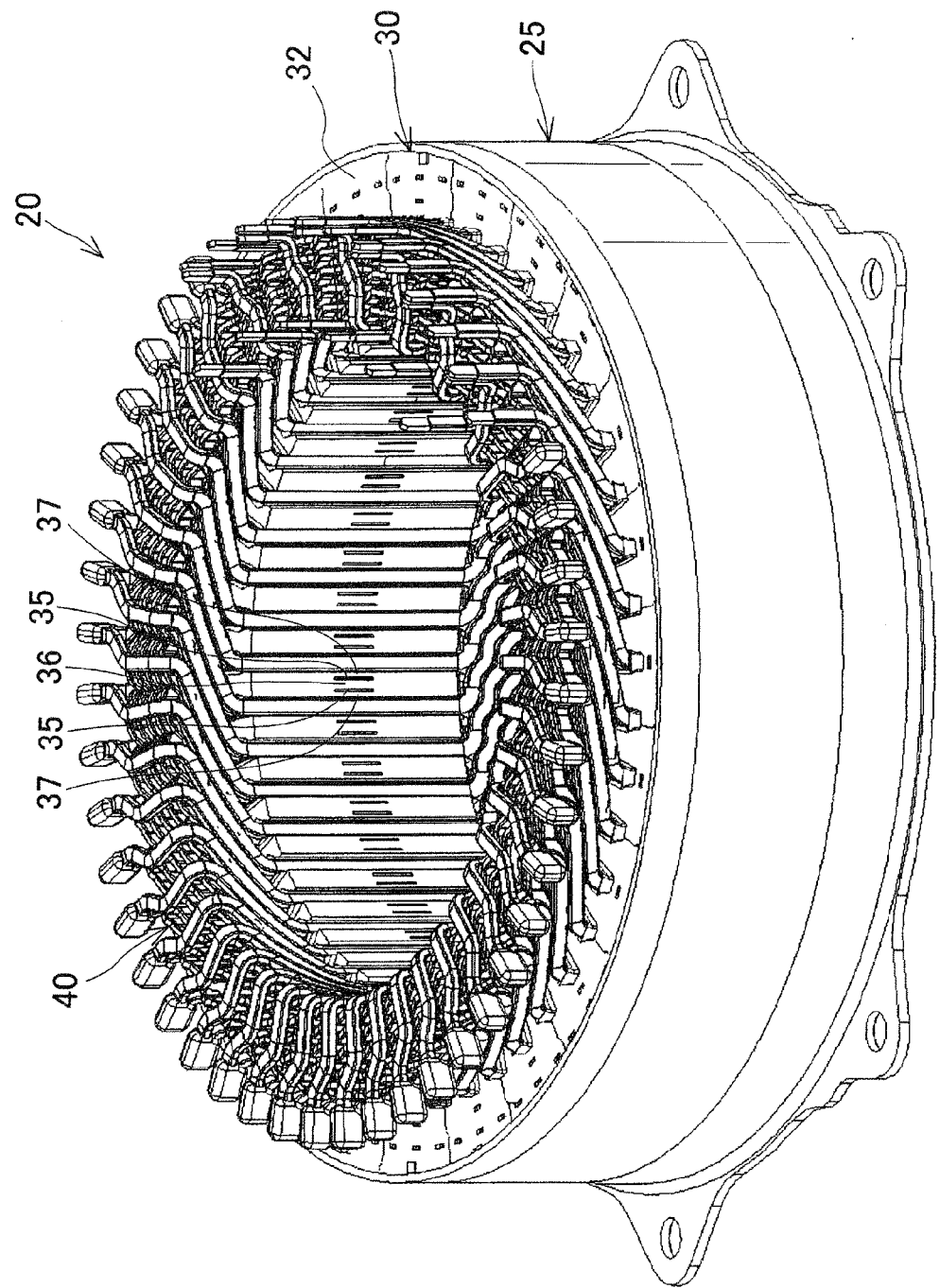
FIG. 12 is a perspective view of a stator according to a fourth embodiment.

In comparison, in the present embodiment, as shown in FIG. 12, for each of the stator teeth 34, each of the slits 35 of the stator tooth 34 is formed only in an axially-central portion of the distal end surface of the stator tooth 34 so as to extend in the axial direction of the stator core 30 for the axial length of the axially-central portion.

With the above configuration, in forming the oblique parts 37 of the stator tooth 34, the bending process is performed only for the axial length of the axially-central portion of the distal end surface of the stator tooth 34. Consequently, it is possible to easily perform the bending process. In addition, it is also possible to reduce residual stress induced in the stator tooth 34 during the bending process, thereby suppressing the decrease in efficiency of the electric rotating machine 1 due to the residual stress.

Fifth Embodiment

This embodiment illustrates a stator 20 which has almost the same configuration as the stator 20 according to the first embodiment; accordingly, only the difference therebetween will be described hereinafter.

In the first embodiment, as shown in FIG. 2, for each of the stator teeth 34, each of the slits 35 of the stator tooth 34 is formed in the distal end surface of the stator tooth 34 so as to continuously extend in the axial direction of the stator core 30 over the entire axial length of the stator core 30.

Figure 13:
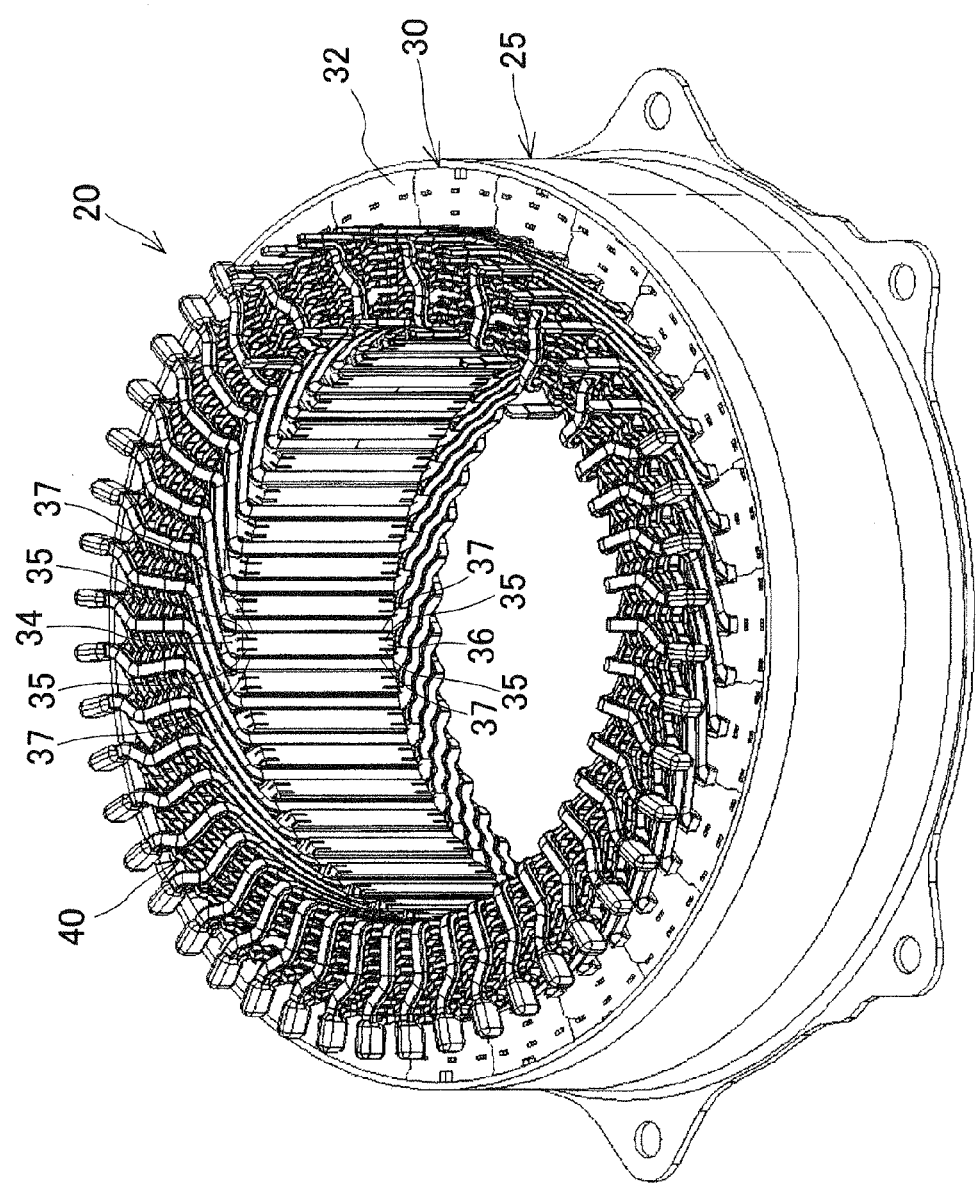
FIG. 13 is a perspective view of a stator according to a fifth embodiment.

In comparison, in the present embodiment, as shown in FIG. 13, for each of the stator teeth 34, each of the slits 35 of the stator tooth 34 is comprised of two slit segments that are respectively formed in two opposite axial end portions of the distal end surface of the stator tooth 34 so as to extend in the axial direction of the stator core 30 respectively for the axial lengths of the axial end portions.

With the above configuration, in forming the oblique parts 37 of the stator tooth 34, the bending process is performed only for the axial lengths of the axial end portions of the distal end surface of the stator tooth 34. Consequently, it is possible to easily perform the bending process. In addition, it is also possible to reduce residual stress induced in the stator tooth 34 during the bending process, thereby suppressing the decrease in efficiency of the electric rotating machine 1 due to the residual stress.

Sixth Embodiment

This embodiment illustrates a stator 20 which has almost the same configuration as the stator 20 according to the first embodiment; accordingly, only the difference therebetween will be described hereinafter.

In the first embodiment, as shown in FIG. 3, for each of the stator teeth 34, each of the oblique parts 37 of the stator tooth 34 has a distal end surface that is positioned radially outside of the distal end surface of the base part 36, in other words, positioned radially outside of the imaginary cylindrical plane that defines the inner diameter of the stator core 30.

Figure 14:
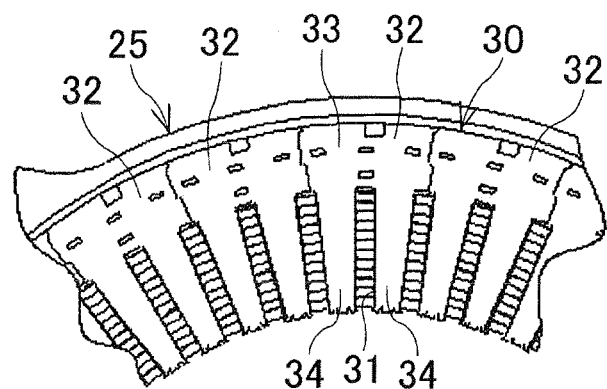
FIG. 14 is a schematic view illustrating distal end portions of stator teeth of a stator according to a sixth embodiment after forming oblique parts of the distal end portions.
Figure 14:
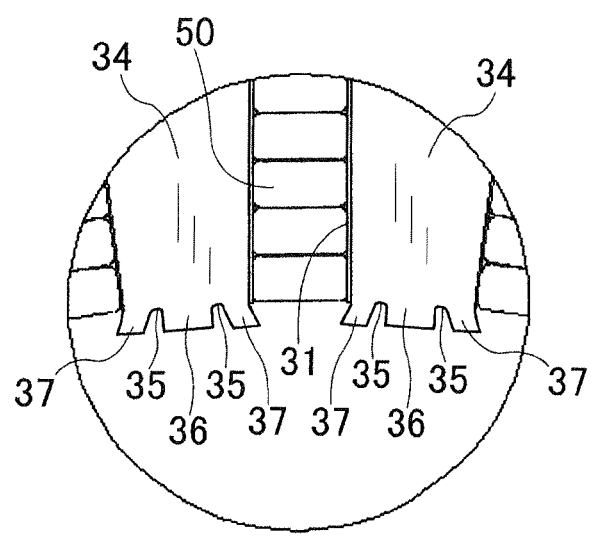
Figure 15A:
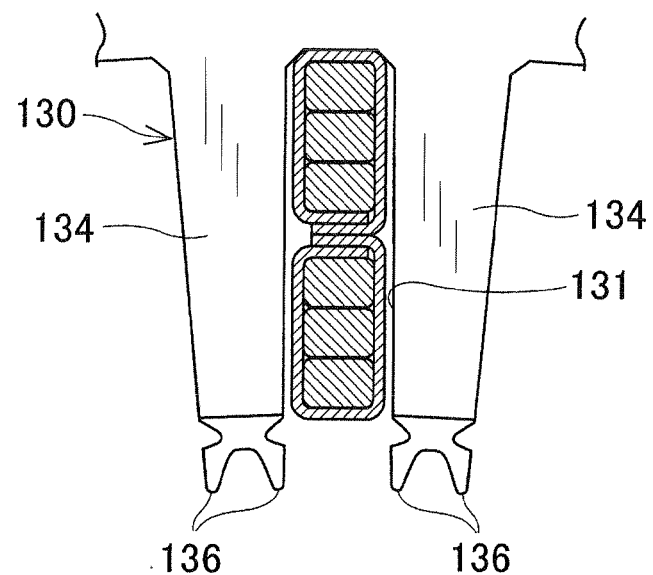
FIGS. 15A and 15B are schematic views illustrating the formation of a stator core according to a prior art.
Figure 15B:
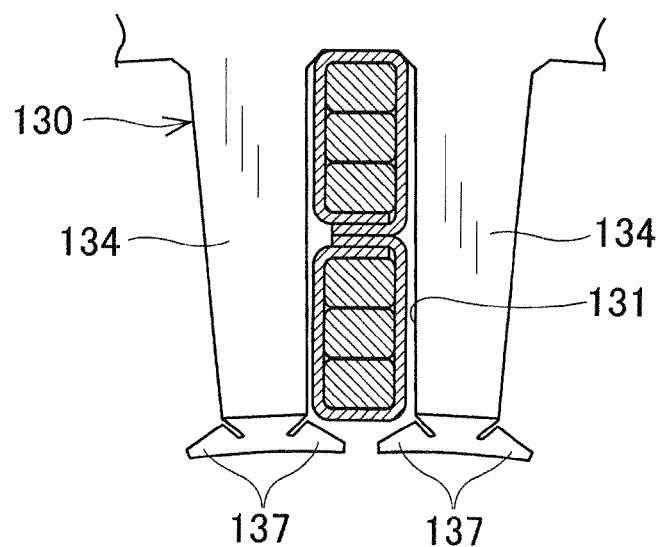
Figure 16:
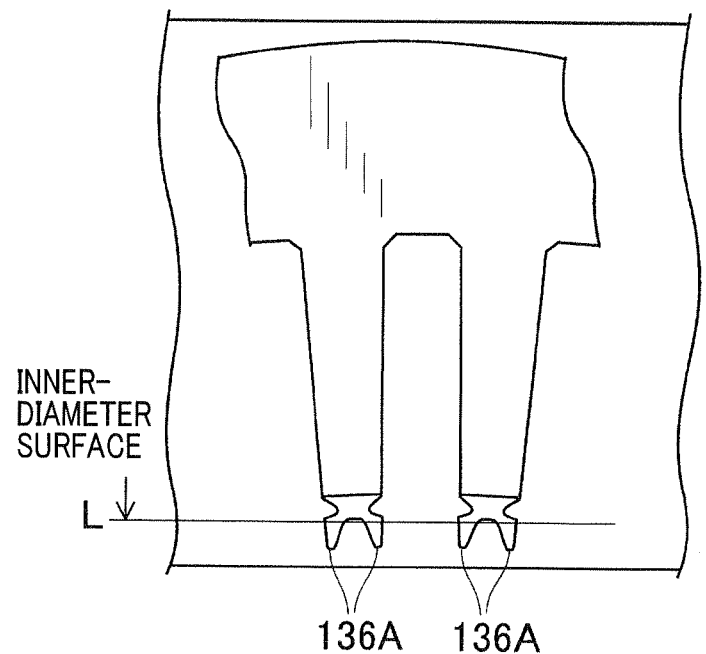
FIG. 16 is a schematic view illustrating a low yield rate of the stator core according to the prior art.

In comparison, in the present embodiment, as shown in FIG. 14, for each of the stator teeth 34, each of the oblique parts 37 of the stator tooth 34 has a distal end surface that lies in the imaginary cylindrical plane defining the inner diameter of the stator core 30 and thus also makes up an inner-diameter surface of the stator core 30. That is, the distal end surfaces of the oblique parts 37 lie in the same imaginary cylindrical plane as the distal end surface of the base part 36. In addition, in forming the stator core sheets of the stator core 30 by blanking them out of a magnetic steel sheet, those parts of the magnetic steel sheet which are predetermined to make up the oblique parts 37 have almost the same shape as the finally-obtained oblique parts 37.

With the above configuration of the stator 20 according to the present embodiment, the total area of the inner-diameter surfaces of the stator core 30 is increased, thereby increasing the torque of the electric rotating machine 1.

In addition, the stator 20 according to the present embodiment also has the same advantages as the stator 20 according to the first embodiment.

While the above particular embodiments have been shown and described, it will be understood by those skilled in the art that various modifications, changes, and improvements may be made without departing from the spirit of the invention.

What is claimed is:

1. A stator for an electric rotating machine, the stator comprising:
   a hollow cylindrical stator core having a plurality of stator teeth and a plurality of slots, the stator teeth each extending radially inward and being spaced from one another in a circumferential direction of the stator core, each of the slots being formed between a corresponding circumferentially-facing pair of side surfaces of the stator teeth so as to open at a radially inner periphery of the stator core; and
   a stator coil comprised of a plurality of electric wires that are mounted on the stator core so as to be received in the slots of the stator core,
   wherein
   each of the stator teeth has a distal end portion and the distal end portion includes a slit, a base part and an oblique part,
   the slit is formed in a distal end surface of the stator tooth so as to continuously extend in an axial direction of the stator core over an entire axial length of the stator core,
   the base part and the oblique part are formed respectively on opposite circumferential sides of the slit over the entire axial length of the stator core, the base part extends radially inward so as to have a distal end surface that makes up an inner-diameter surface of the stator core, the oblique part is bent toward an adjacent one of the slots of the stator core so as to extend obliquely with respect to the base part, the stator core is comprised of a plurality of stator core segments that are arranged in the circumferential direction of the stator core so as to adjoin one another in the circumferential direction, wherein the oblique part has a constant width from a proximal end to a distal end of the oblique part, wherein the oblique part has a distal end surface that lies in the same cylindrical plane as the distal end surface of the base part, and wherein the stator coil is formed of a plurality of electric wires each having a substantially rectangular cross section.

2. The stator as set forth in claim 1, wherein for each of the stator teeth, the slit is a first slit and the oblique part is a first oblique part of the distal end portion of the stator tooth, the distal end portion of the stator tooth further includes a second slit and a second oblique part, the second slit is also formed in the distal end surface of the stator tooth so as to extend in the axial direction of the stator core, the base part is interposed between the first and second slits in the circumferential direction of the stator core, the second oblique part is formed on the opposite side of the second slit to the base part in the circumferential direction of the stator core, and the second oblique part is also bent toward an adjacent one of the slots of the stator core so as to extend obliquely with respect to the base part.

3. The stator as set forth in claim 1, wherein the oblique part extends obliquely at a predetermined acute angle with respect to the base part.

4. A method of manufacturing a stator for an electric rotating machine, the method comprising the steps of:

preparing a hollow cylindrical stator core and a stator coil, the stator core having a plurality of stator teeth and a plurality of slots, the stator teeth each extending radially inward and being spaced from one another in a circumferential direction of the stator core, each of the slots being formed between a corresponding circumferentially-facing pair of side surfaces of the stator teeth so as to open at a radially inner periphery of the stator core;

forming, for each of the stator teeth, a slit in a distal end surface of the stator tooth so as to continuously extend in an axial direction of the stator core over an entire axial length of the stator core;

assembling the stator core and the stator coil together; and bending, for each of the stator teeth, a part of a distal end portion of the stator tooth, which is on one circumferential side of the slit and adjacent to one of the slots of the stator core, toward the adjacent slot so as to extend obliquely with respect to a base part of the distal end portion, the base part being on the other circumferential side of the slit and extending radially inward so as to have a distal end surface that makes up an inner-diameter surface of the stator core, wherein in the bending step, the base part and the oblique part are formed respectively on opposite circumferential sides of the slit over the entire axial length of the stator core, the stator core prepared in the preparing step is comprised of a plurality of stator core segments, and after the assembling step, the stator core segments are arranged in the circumferential direction of the stator core so as to adjoin one another in the circumferential direction, wherein in the bending step, the oblique part is formed so as to have a constant width from a proximal end to a distal end of the oblique part, wherein the oblique part has a distal end surface that lies in the same cylindrical plane as the distal end surface of the base part, and wherein the stator coil is formed of a plurality of electric wires each having a substantially rectangular cross section.

5. The stator as set forth in claim 1, wherein except at the distal end portions of the stator teeth, each circumferentially-facing pair of the side surfaces of the stator teeth extend parallel to each other.

* * * * *

UNITED STATES PATENT AND TRADEMARK OFFICE
CERTIFICATE OF CORRECTION

PATENT NO. : 9,583,987 B2  
APPLICATION NO. : 13/352526  
DATED : February 28, 2017  
INVENTOR(S) : Ikuta et al.

Page 1 of 1

It is certified that error appears in the above-identified patent and that said Letters Patent is hereby corrected as shown below:

On the Title Page

(56) References Cited, U.S. Patent Documents  
Insert:

--6,137,201    A *    10/2000    Umeda et al.  
6,242,835    B1 *    6/2001    Uemura et al.--

Signed and Sealed this  
Twenty-third Day of May, 2017

Michelle K. Lee  
*Director of the United States Patent and Trademark Office*